(12) United States Patent
Cink

(10) Patent No.: US 10,617,110 B2
(45) Date of Patent: Apr. 14, 2020

(54) PEST MONITORING SYSTEM AND METHOD

(71) Applicant: BASF SE, Ludwigshafen (DE)

(72) Inventor: James H. Cink, Wake Forest, NC (US)

(73) Assignee: BASF SE, Ludwigshafen (DE)

( * ) Notice: Subject to any disclaimer, the term of this patent is extended or adjusted under 35 U.S.C. 154(b) by 220 days.

(21) Appl. No.: 14/917,850

(22) PCT Filed: Sep. 10, 2014

(86) PCT No.: PCT/IB2014/064392
§ 371 (c)(1),
(2) Date: Mar. 9, 2016

(87) PCT Pub. No.: WO2015/036934
PCT Pub. Date: Mar. 19, 2015

(65) Prior Publication Data
US 2016/0219858 A1 Aug. 4, 2016

Related U.S. Application Data

(60) Provisional application No. 61/876,059, filed on Sep. 10, 2013.

(51) Int. Cl.
*A01M 1/02* (2006.01)
*A01M 1/20* (2006.01)

(52) U.S. Cl.
CPC .......... *A01M 1/026* (2013.01); *A01M 1/2011* (2013.01)

(58) Field of Classification Search
CPC .................................................... A01M 1/026
See application file for complete search history.

(56) References Cited

U.S. PATENT DOCUMENTS 5,877,422 A * 3/1999 Otomo .................. A01M 1/026
340/573.2
6,052,066 A * 4/2000 Su ......................... A01M 1/026
340/573.1
(Continued)

FOREIGN PATENT DOCUMENTS

JP 2005-527182 A 9/2005
WO 2003013237 A2 2/2003
(Continued)

OTHER PUBLICATIONS

International Search Report and Written Opinion for Application No. PCT/IB2014/064392 dated Dec. 16, 2014, 10 pages.
(Continued)

*Primary Examiner* — Michael H Wang
(74) *Attorney, Agent, or Firm* — Armstrong Teasdale LLP

(57) ABSTRACT

In a pest monitoring system (21) and method, a monitoring device (111) is located in proximity to a structure and includes a bait product (113) and a sensor (116) disposed within the bait product. The sensor includes a filament (118) encased within an encasement (119) and reactive to exposure to the environment exterior of the encasement such that at least one electrical characteristic of the sensor changes in response to such exposure. A communication member (121) is connected to the bait product in communication with the sensor to determine the at least one electrical characteristic and send a signal indicative of the at least one electrical characteristic. Based on a plurality of the signals received from of infestation of pests at the at least one monitoring device and a level of degradation of the bait product is determined.

15 Claims, 7 Drawing Sheets

(56) References Cited

U.S. PATENT DOCUMENTS

| | | | | |
|---|---|---|---|---|
| 6,100,805 A * | 8/2000 | Lake | A01M 1/026 340/540 |
| 6,150,944 A * | 11/2000 | Martin | A01M 1/026 340/573.1 |
| 6,164,010 A * | 12/2000 | Snell | A01M 1/026 43/114 |
| 6,166,641 A * | 12/2000 | Oguchi | A01M 1/026 340/573.1 |
| 6,255,959 B1 * | 7/2001 | Lake | A01M 1/026 29/825 |
| 6,281,799 B1 * | 8/2001 | Lake | A01M 1/026 340/573.1 |
| 6,304,185 B1 * | 10/2001 | Tuttle | A01M 1/026 340/10.1 |
| 6,445,301 B1 * | 9/2002 | Farrell | A01M 31/002 340/384.2 |
| 7,084,640 B2 * | 8/2006 | Berhorst | A01M 1/026 324/611 |
| 7,212,129 B2 * | 5/2007 | Barber | A01M 1/026 29/825 |
| 7,671,750 B2 * | 3/2010 | Tolley | A01M 1/026 340/539.26 |
| 8,454,985 B2 * | 6/2013 | Eger, Jr. | A01M 1/026 424/410 |
| 2001/0009399 A1 * | 7/2001 | Barber | A01M 1/026 340/573.2 |
| 2003/0001745 A1 * | 1/2003 | Barber | A01M 1/026 340/573.2 |
| 2003/0160699 A1 * | 8/2003 | Trompen | A01M 1/026 340/573.2 |

FOREIGN PATENT DOCUMENTS

| | | |
|---|---|---|
| WO | 03082002 A1 | 10/2003 |
| WO | 2009143205 A2 | 11/2009 |

OTHER PUBLICATIONS

International Search Report for Application No. PCT/IB2014/064392 dated Dec. 16, 2014, 5 pages.

* cited by examiner

PEST MONITORING SYSTEM AND METHOD

CROSS-REFERENCE TO RELATED APPLICATIONS

This application is a U.S. National Phase Application of PCT/IB2014/064392, filed Sep. 10, 2014, which claims priority to U.S. Provisional Patent Application Ser. No. 61/876,059 filed on Sep. 10, 2013, both of which are incorporated herein by reference in their entirety.

BACKGROUND OF THE DISCLOSURE

The field of the disclosure relates generally to pest control, more particularly to pest monitoring systems and methods of remote monitoring for the presence of pests, and even more particularly to bioreactive sensing systems and methods of remote monitoring of and/or control of pests.

The current state of the art for one type of pest control products, and more specifically termite baiting products, includes a combination of a station housing and suitable bait system. The station housing is typically installed in a manner where the majority, if not all of the station housing is located below ground level. Into these stations a termite bait product (e.g., a combination of a bait matrix and a toxicant) is placed that is designed to be palatable to termites and encourages feeding on the bait matrix along with the toxicant. In other prior systems, termite monitoring and control includes a two stage system, including the use of a monitoring device that is initially used in place of the bait product within the station housing. Once the monitoring device provides an indication of the presence of termites, a suitable bait product is inserted into the station housing in place of or in addition to the monitoring device.

In one system intended to allow for remote monitoring for the presence of termites, a monitoring device capable of communication with a suitable interrogator disposed exterior of the station housing (e.g., carried by a service technician responsible for checking on the station) is positioned in the station housing. The monitoring device includes a radio-frequency (RF) communication system along with two wooden sticks between which is sandwiched a paper filament having a single electrically conductive circuit thereon. Activation of the RF communication system, such as by the interrogator, causes a reading of the electrically conductive circuit and the RF communication system sends a signal to the interrogator as to the condition of the circuit. As long as the circuit remains intact, a signal generated by the RF communication system relays a signal that the circuit is still intact, indicating that termites are not present. If the circuit is broken or otherwise damaged, such as by termite feeding, the electrical characteristic of the conductive circuit is changed and a signal indicating the presence of termites is relayed by the RF communicator to the interrogator. The service technician would then open the station and replace the monitor with a bait product containing a toxicant.

One drawback to such a system is that moisture, decay and some other insects could disrupt the electrically conductive circuit, resulting in a false indication of termite activity and causing the service technician to spend valuable time opening, inspecting and replacing the internal monitor. Because an individual residence can have an average of 20 stations installed around the resident structure, the total time wasted opening and inspecting inactive stations can be significant and increase cost exponentially when considering the cost of labor. Additionally, this type of system allows for what is best described as a "yes or no" monitoring of the presence of termites, e.g., once the presence of termites is indicated by the monitoring device, no further monitoring or information is available from the device to indicate the level of termite presence and/or the amount of the monitoring device that has been damaged.

There is a need, therefore, for an improved remote pest control monitoring system that provides redundancy and the ability to monitor the level of infestation and/or damage to the monitoring device.

BRIEF DESCRIPTION OF THE DISCLOSURE

In one aspect, a pest monitoring system generally comprises a station housing having an interior space, and a pest monitoring device positionable at least in part within the interior space of the station housing and operable to monitor for the presence of pests within the interior space of the station housing. The pest monitoring device generally comprises a bait product positionable within the interior space of the station housing. An electrically conductive sensor is disposed at least in part within the bait product, with the sensor comprising an electrically conductive filament and an encasement at least in part encasing the electrically conductive filament. The electrically conductive filament is reactive to exposure to the environment within the interior space of the station housing such that at least one electrical characteristic of the electrically conductive sensor changes in response to exposure of the filament to the environment within the interior space of the station housing. A communication member is disposed within the station housing in communication with the electrically conductive sensor. The communication member is operable to determine the at least one electrical characteristic of the electrically conductive sensor and to send a signal exterior of the station housing indicative of the at least one electrical characteristic of the electrically conductive sensor.

In another aspect, a pest monitoring system generally comprises a station housing having an interior space, and a pest monitoring device positionable at least in part within the interior space of the station housing and operable to monitor for the presence of pests within the interior space of the station housing, the pest monitoring device comprising. A bait product is positionable within the interior space of the station housing. An electrically conductive sensor is disposed at least in part within the bait product, with the sensor generally comprising a plurality of electrically conductive filaments electrically connected together to define a parallel circuit, and an encasement at least in part encasing the electrically conductive filaments. A communication member is disposed within the station housing in communication with the electrically conductive sensor. The communication member is operable to determine the at least one electrical characteristic of the electrically conductive sensor and to send a signal exterior of the station housing indicative of the at least one electrical characteristic of the electrically conductive sensor.

In one aspect, a method of monitoring for the presence of pests in proximity to a structure generally comprises locating at least one monitoring device in proximity to the structure. The monitoring device generally comprises a bait product and an electrically conductive sensor disposed at least in part within the bait product. The sensor generally comprises an electrically conductive filament and an encasement at least in part encasing the electrically conductive filament, with the electrically conductive filament being reactive to exposure to the environment exterior of the encasement such that at least one electrical characteristic of the electrically conductive sensor changes in response to exposure of the filament to the environment exterior of the encasement. A communication member is connected to the bait product in communication with the electrically conductive sensor, with the communication member being operable to determine the at least one electrical characteristic of the electrically conductive sensor and to send a signal exterior of the station housing indicative of the at least one electrical characteristic of the electrically conductive sensor. A signal is intermittently received from the communication member indicative of the at least one electrical characteristic of the electrically conductive sensor. Based on a plurality of the signals received from the communication member over a period to time, at least one of a level of infestation of pests at the at least one monitoring device and a level of degradation of the bait product is determined.

BRIEF DESCRIPTION OF THE DRAWINGS

Corresponding reference characters indicate corresponding parts throughout the several views of the drawings.

DETAILED DESCRIPTION OF THE DISCLOSURE

Figure 1:
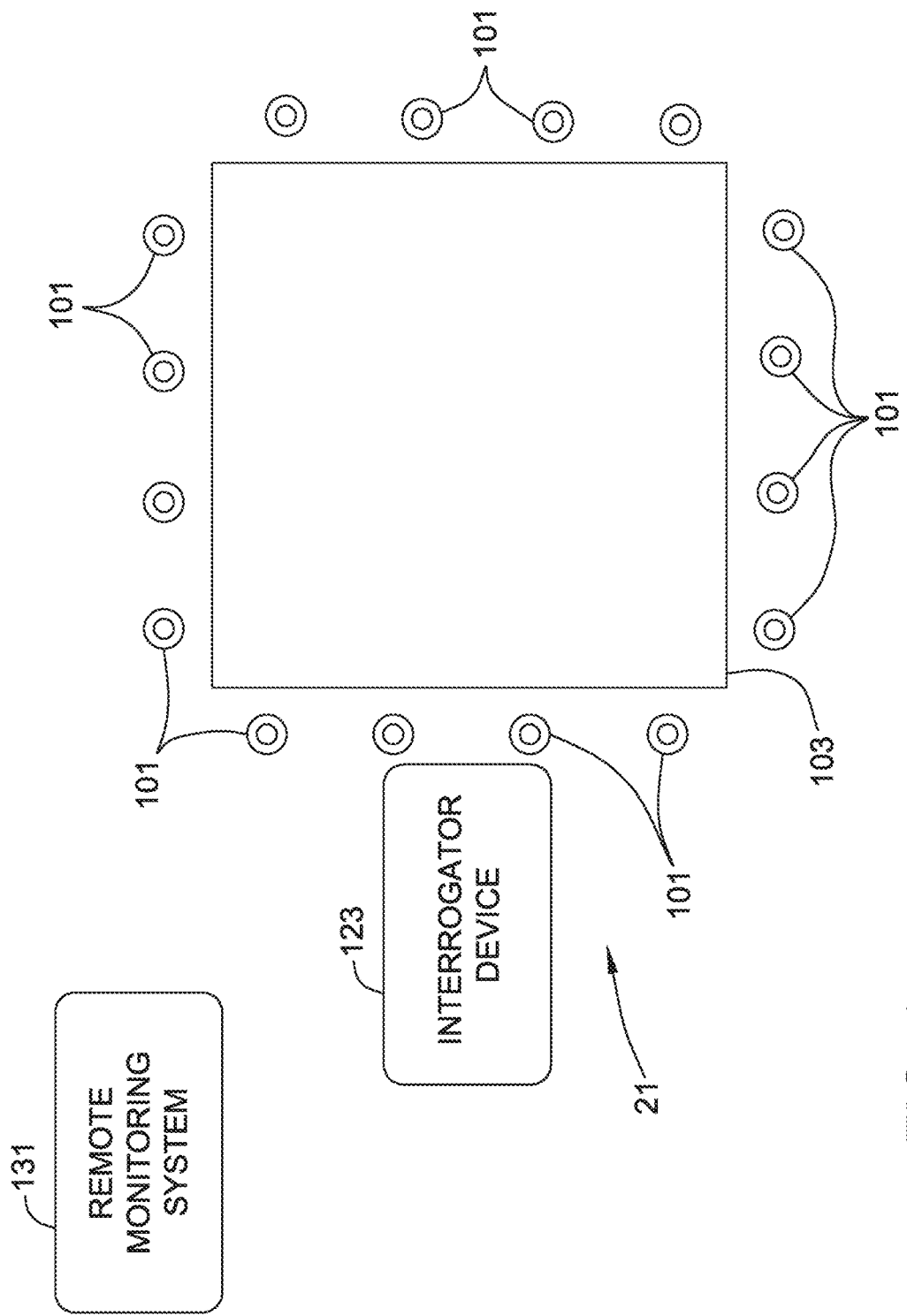
FIG. 1 is a schematic illustration of one embodiment of a pest monitoring system.

With reference to the drawings and in particular to FIG. 1, one embodiment of a remote pest control monitoring system 21 is shown and described herein with particular reference to a termite monitoring system. For example, in the illustrated embodiment the remote monitoring system 21 comprises a plurality of termite stations 101 disposed (e.g., set at least partially into the soil) at intermittent locations about the perimeter of a residential structure 103 or other structure to be monitored for the presence of termites. It is understood that any number of termite stations 101 may be disposed about the structure 103, and the termite stations may be disposed other than about the entire perimeter of the structure, such as a long one or more discrete segments of the perimeter.

Figure 2:
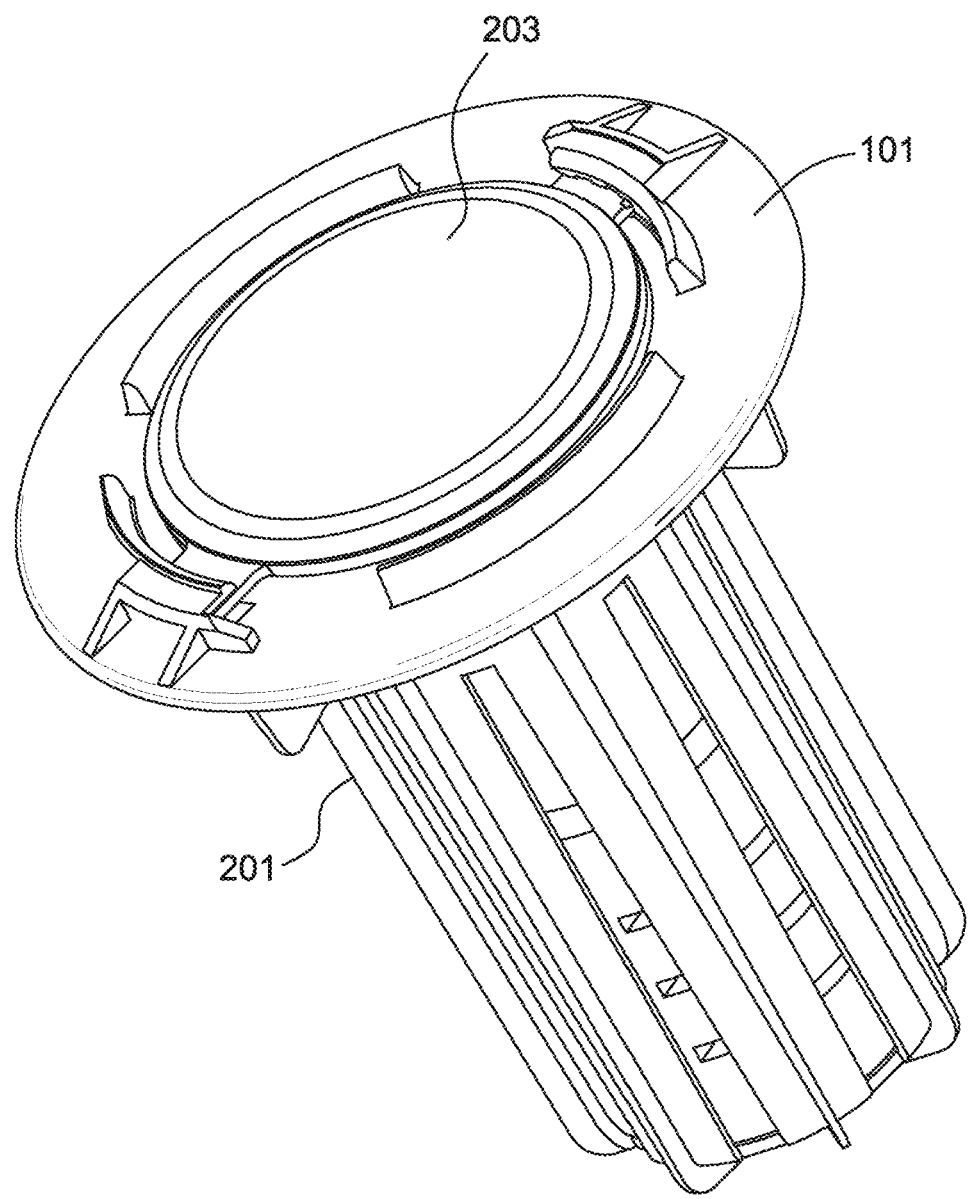
FIG. 2 is a perspective view of one embodiment of a termite station for use with the pest monitoring system of FIG. 1.

With reference to FIG. 2, each termite station 101 may comprise a station housing 201 that is positionable at least in part down into the soil and defines an interior space for disposition of the various components of the termite station. The illustrated station housing 201 includes a removable closure 203.

Figure 3:
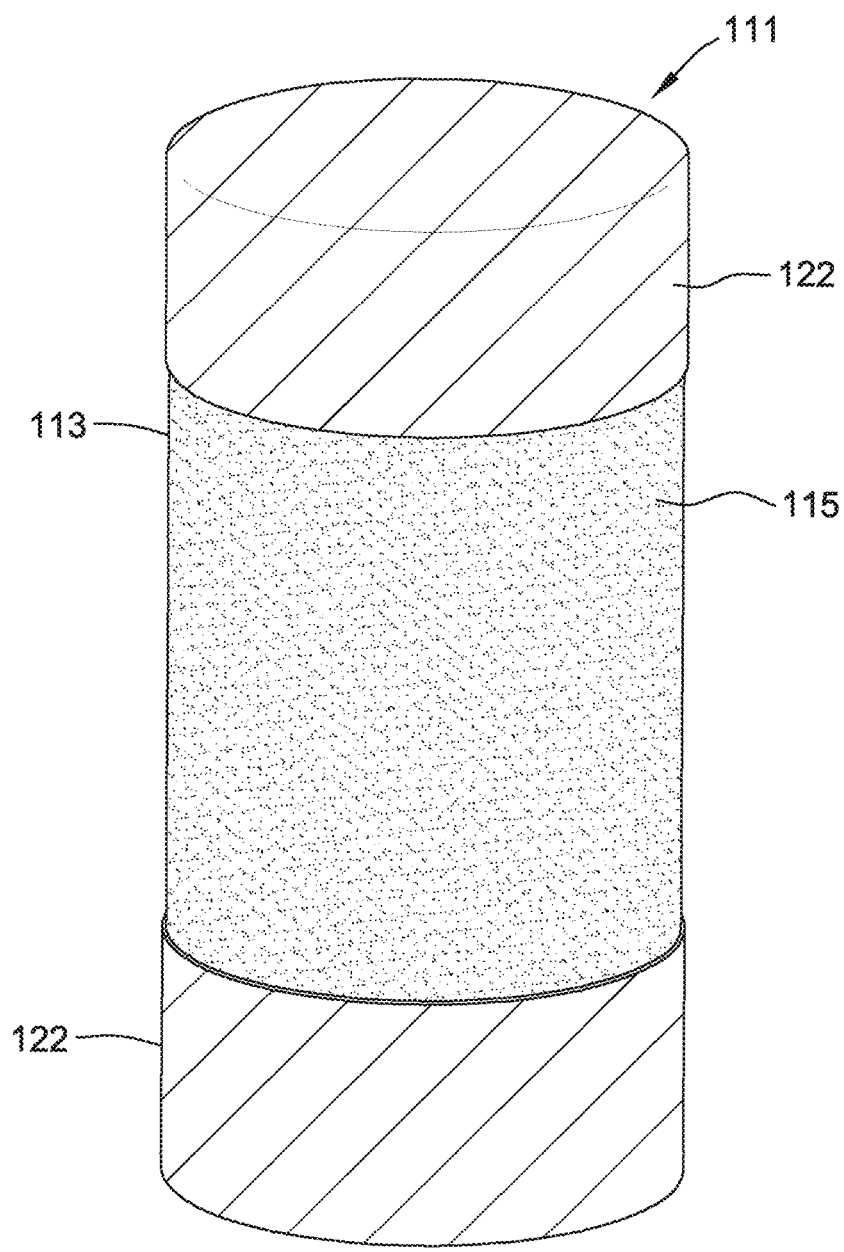
FIG. 3 is a perspective view of one embodiment of a monitoring device for use with the pest monitoring system of FIG. 1 and positionable in the termite station of FIG. 2.

That station housing 201 houses a monitoring device 111 (FIG. 3). The monitoring device 111 is suitably a bioreactive monitoring device, which as used herein refers to a monitoring device that is responsive to the presence of a pest or pests to be monitored and/or controlled by the bioactive remote sensing system 21. For example, in the embodiment of FIG. 1 where the system 21 is for monitoring and/or controlling termites, the bioreactive monitoring device 111 is responsive to the presence of termites in the station housing 201, and in a more particular embodiment the device is responsive to termites that come into contact with the device, such as by feeding or chewing on the device. In the illustrated embodiment, the bioreactive monitoring device includes a bait product 113 configured for disposition within the station housing 201 for at least monitoring and in some embodiments controlling termites. The bait product 113 includes at least a material matrix 115 that is palatable and more suitably attractive to termites. Where controlling of termites is intended, the bait product 113 may further include an active ingredient that is a toxicant to termites. Suitable materials from which the material matrix 115 may be constructed are known to those of skill in the art and are not further described herein. Suitable active ingredients that are toxicants to termites are also known to those of ordinary skill in the art.

Figure 4:
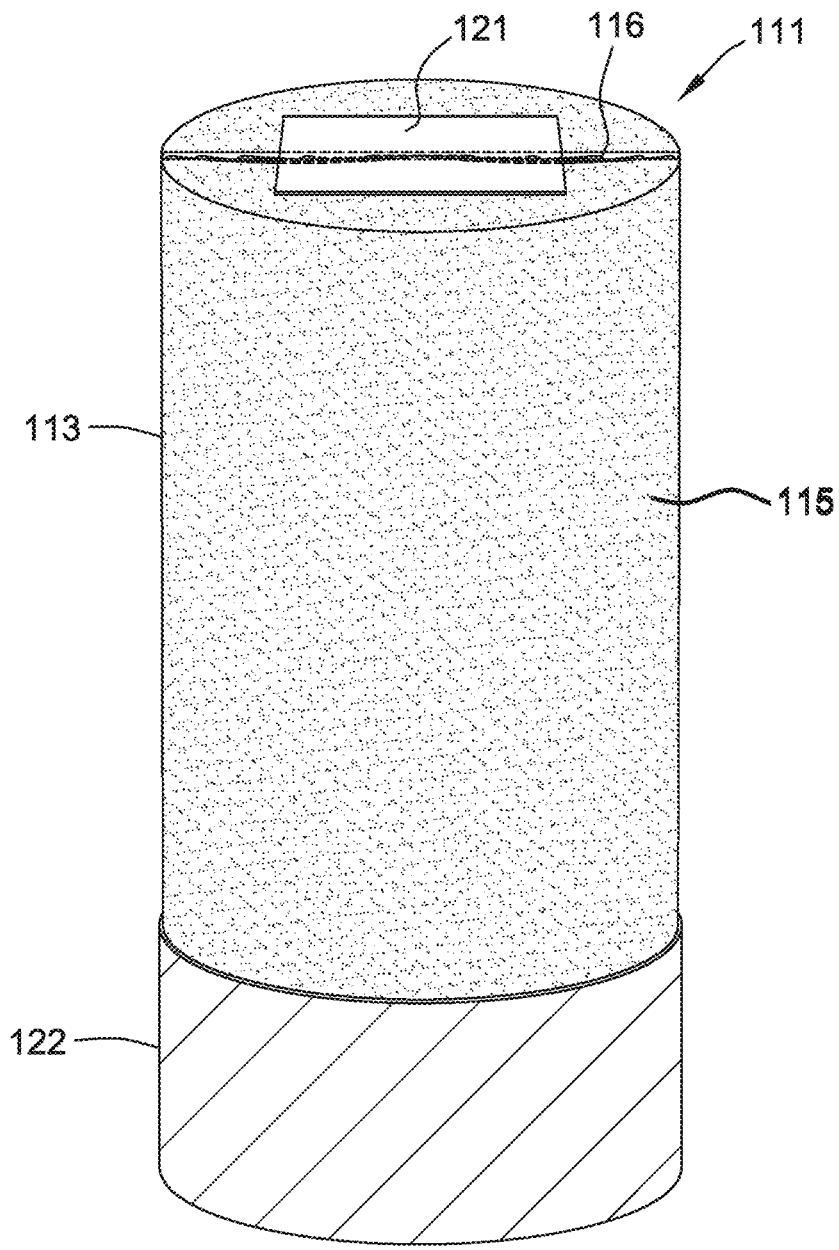
FIG. 4 is a perspective view of the monitoring device of FIG. 3 with an end cap removed to reveal further construction of the monitoring device.
Figure 5:
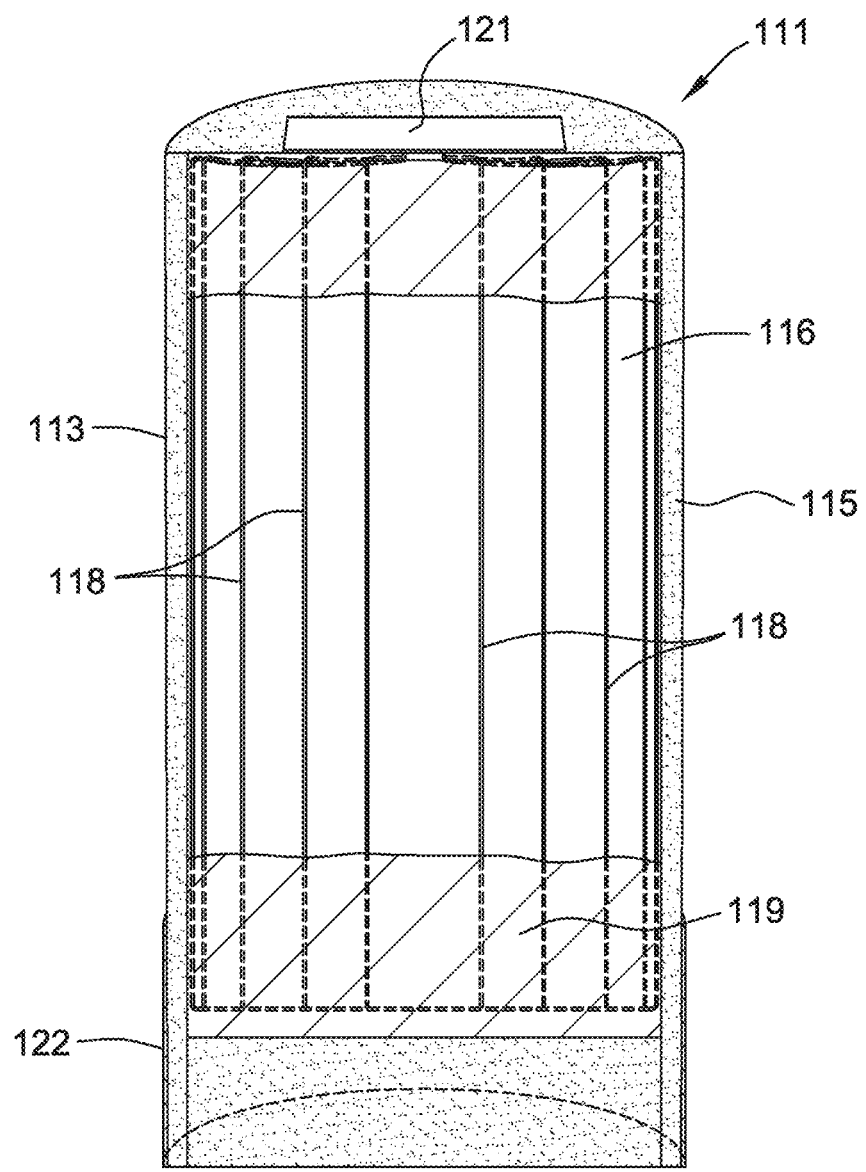
FIG. 5 is a perspective view of one half of the monitoring device of FIG. 4 with an electrically conductive sensor illustrated along with a communication member.

In the illustrated embodiment, the bait product 113 is generally cylindrical in accordance with the shape of the station housing 201. It is understood, however, that the station housing 201 and/or the bait product 113 may be of any suitable shape without departing from the scope of this invention. With particular reference to FIGS. 4 and 5, the illustrated bait product 113 is formed in two longitudinal halves that upon assembly are in generally face-to-face relationship with each other. An electrically conductive sensor 116 is disposed and extends longitudinally between (e.g., is sandwiched by) the two halves of the bait product. It is understood that in other embodiments the bait product 113 may be of a unitary construction with the electrically conductive sensor 116 at least in part embedded with the bait product and remain within the scope of this invention.

The electrically conductive sensor 116 according to one suitable embodiment comprises a series of filaments 118 (e.g., wire) connected together to form a parallel circuit in which a plurality of the filaments extend longitudinally of the bait product 113 in generally parallel spaced relationship with each other across the width of the bait product. In other embodiments, the parallel filaments 118 may extend across the width of the bait product 113 in spaced relationship along the height of the bait product. Other configurations of such a parallel circuit are also contemplated to be within the scope of this invention. The filaments 118 are suitably made from an electrically conductive material that is reactive upon exposure to the environment within the station housing 201 (e.g., moisture, air, soil, termite by-products) one or more electrically conductive characteristics of the filaments, such as conductivity and/or resistivity, change as a result of such exposure. For example, any suitable metal, composite or other material for which conductivity, resistivity or other electrical conductance characteristic changes as a result of corrosion, oxidation or other reaction from being exposed to the environment within a station housing 201 may be used as the filament material. Some non-limiting examples of a suitable filament material include magnesium wire, copper wire, metallized inks and reactive gels.

The electrically conductive sensor 116 further includes an encasement 119 for substantially encasing the filaments therein. In one particularly suitable embodiment, the encasement 119 is constructed at least in part of a termite acceptable material through which termites can chew, and more suitably are induced to chew, upon entering the station housing 201. The term "termite acceptable material" refers to a material that termites will chew through in the normal course of feeding. For example, in one embodiment the termite acceptable material may comprise a polymeric coating, sheathing, wrap, pouch or other encasement such as, without limitation, cellulose acetate butyrate, cellulose acetate proprionate, polystyrene, polyethylene, polyurethane and polypropylene. In other embodiments the termite acceptable material may comprise a wax coating or encasement. In the illustrated embodiment the encasement 119 is in the form of a pouch in which the entire set of filaments 118 is encased (with the exception of suitable leads that extend outward to the upper end of the bait product 113). In another embodiment, the front and back panels of the encasement 119 may be adhered together between the longitudinal extensions of the filaments 118 so that each filament is encased within a respective individual pouch. It is also contemplated that the encasement 119 may alternatively comprise a coating or sheath encasing each individual filament and remain within the scope of this invention.

With reference still to FIGS. 4 and 5, the monitoring device 111 further comprises a communication member 121 capable of transmitting one or more electrical characteristics of the electrically conductive sensor 116. In particular, the communication member 121 is capable of energizing the electrically conductive circuit to assess at least one electrical characteristic of the sensor 116 and to transmit a signal indicative of the at least one electrical characteristic of the sensor to a location remote from the station housing 201. In one embodiment, for example, the communication member 121 is a radio frequency (RF) communication member that is in electrical communication with the electrically conductive sensor 116. More suitably the communication member 121 is an RF transceiver capable of receiving and transmitting signals from the station housing 201. In a more suitable embodiment, the communication member 121 is capable of wireless communication, such as, without limitation, RF (e.g., Passive RFID, Active RFID, Semi-Passive RFID, High Frequency RFID, Low Frequency RFID, Ultra High Frequency RFID), Near Field Communication (NFC), Bluetooth Low Energy (BLE), Bluetooth Smart, WiFi, Mesh Networks, Wide Area Networks, Satellite Communication, Cellular Communications, Far field communications, Beacon, Inductive Coupling, Capacitive Coupling, IEEE 802.11, IEEE 802.15.4, 3G Cellular, 4G Cellular, IEEE 802.16, WiMax, Zigbee and WirelessHart.

As illustrated in FIGS. 3 and 4, end caps 122 are provided at each of the opposite ends of the monitoring device 111. The end 122 at the upper end of the monitoring device retains the communication member 121 on the end of the bait product in electrical communication with the leads of the electrically conductive sensor 116. It is understood that in other embodiments one or both of the end caps 122 may be omitted. In other embodiments, the end caps 122 may be longitudinally shorter than as illustrated in the various Figures without departing from the scope of this invention. The end caps 122 may be constructed of any suitable material but in particularly suitable embodiments the end caps are constructed of a termite acceptable material.

With reference back to FIG. 1, the remote sensing system 21 further comprises at least one interrogator device 123 for checking the monitoring device disposed in each of the termite stations 101. In the illustrated embodiment, the at least one interrogator device 123 comprises at least one RF receiver, and more suitable a transceiver, located in proximity to the plurality of termite stations 101. It is understood that the interrogator device 123 may be other than an RF receive or transceiver depending on the wireless communication means being used to communicate with the monitoring devices 111 in the termite stations 101. In one example, one or more interrogator devices 123 may be located in proximity to the structure 103 exterior of but otherwise also in proximity to the termite stations 101. In other embodiments, one or more interrogator devices 123 may alternatively or additionally be located in one or more of the termite stations 101, such as at a station corresponding to one or more corners of the structure 103. In still other embodiments, it is contemplated that the interrogator device 123 may comprise a portable unit that a service technician can carry into proximity to the plurality of termite stations 101 to conduct readings of the status of the termite station sensors 116.

The interrogator device 123 may be passive in that it awaits signals transmitted by the monitoring devices 111, or it may be active in that it sends a signal to the communication member 121 of the monitoring device 111 of a respective termite station 101 requesting status of the sensor for that termite station. The interrogator device 123 then receives a return signal from the communication member 121 as to the status of the respective monitoring device, such as signal indicative of the electrical characteristic of the electrically conductive sensor 116.

In operation according to one embodiment of a pest monitoring method, the communication member 121 is suitably energized, such as by being intermittently energized by a timing unit associated with the communication member or in response to receiving a status request signal from the interrogator device 123. Upon energizing the communication member, at least one electrical characteristic associated with the electrically conductive sensor 116 is determined by the communication member 121. In one embodiment, for example, the at least one electrical characteristic comprises the time it takes for the communication member 121 to energize the sensor 116 and determine the condition of the electrically conductive sensor 116, and more particularly the level of exposure to the environment of the filaments 118 of the sensor. That is, when the electrically conductive sensor 116 is encased within the encasement 119 and the encasement is uncompromised, the response time of the assessment is a first response time and when the substrate has been comprised, such as by being chewed away by termites to expose the filaments to the environment within the station housing 201, the response time of the of the assessment is a second response time that is different from and more suitably greater than the first response time. This provides an indication that termites are active in the termite station 101.

As more of the encasement 119 is compromised by the termites, a greater extent of the filaments is exposed to the environment and thus reacts in view of such exposure. This in turn further changes the at least one electrical characteristic (e.g., in the illustrated embodiment, further increases the second response time) of the electrically conductive sensor. As a result, the electrically conductive sensor can be used to assess degradation or change of the at least one electrical characteristic over a period of time, thus allowing the service technician or other person that monitors the termite stations 101 to assess whether the level of infestation within the termite station is increasing over time. Additionally, because the filaments 118 form a parallel circuit, if one of the filaments breaks (or is chewed through), the circuit continues to be complete to allow continued monitoring of changes to the at least one electrical characteristic. It is understood that the at least one electrical characteristic determined by the monitoring device 111 may be other than the response time and remain within the scope of this invention.

In another embodiment, the termite acceptable material from which the encasement 119 of the sensor 116 is constructed may be selected to wear away over a predetermined time period (e.g., one or two years) so that after a prolonged time period of inactivity in the termite station 101 the at least one electrical characteristic will indicate the need for servicing of the termite station, e.g., replacement of the bait product. For example, the termite acceptable material may be formulated to wear away over a predetermined time period that is associated with the efficacy of the bait product 113 and in particular the active ingredient when present.

With further reference to FIG. 1, the system 21 may further comprise a remote monitoring system 131 remote from the location of the structure 103. For example, the remote monitoring system 131 may be located at the offices of the service technician. The remote monitoring system 131 is suitably capable of communication with the interrogator device 123, such as by wireless communication, internet, cellular service or other suitable communication system to receive status information collected by the interrogator device. In operation, when an altered state of the monitoring device 111 is detected by the interrogator member 123, indicating active termite feeding, this information is transmitted by the interrogator member to the remote monitoring system 131, where a response to the alert can be formulated. For example, a service technician can then schedule time to inspect the termite stations 101.

Such a configuration allows the termite stations 101 at a particular location to be continuously monitored from the remote monitoring system 131. As such, it negates the need for regular visits to the termite station 101 location (e.g., to the residential structure 103) to inspect the termite stations. It also allows the service technician to become aware of and deal with termite activity more quickly, e.g., instead of waiting for the entire period in between regularly scheduled inspection visits by the service technician.

Figure 6:
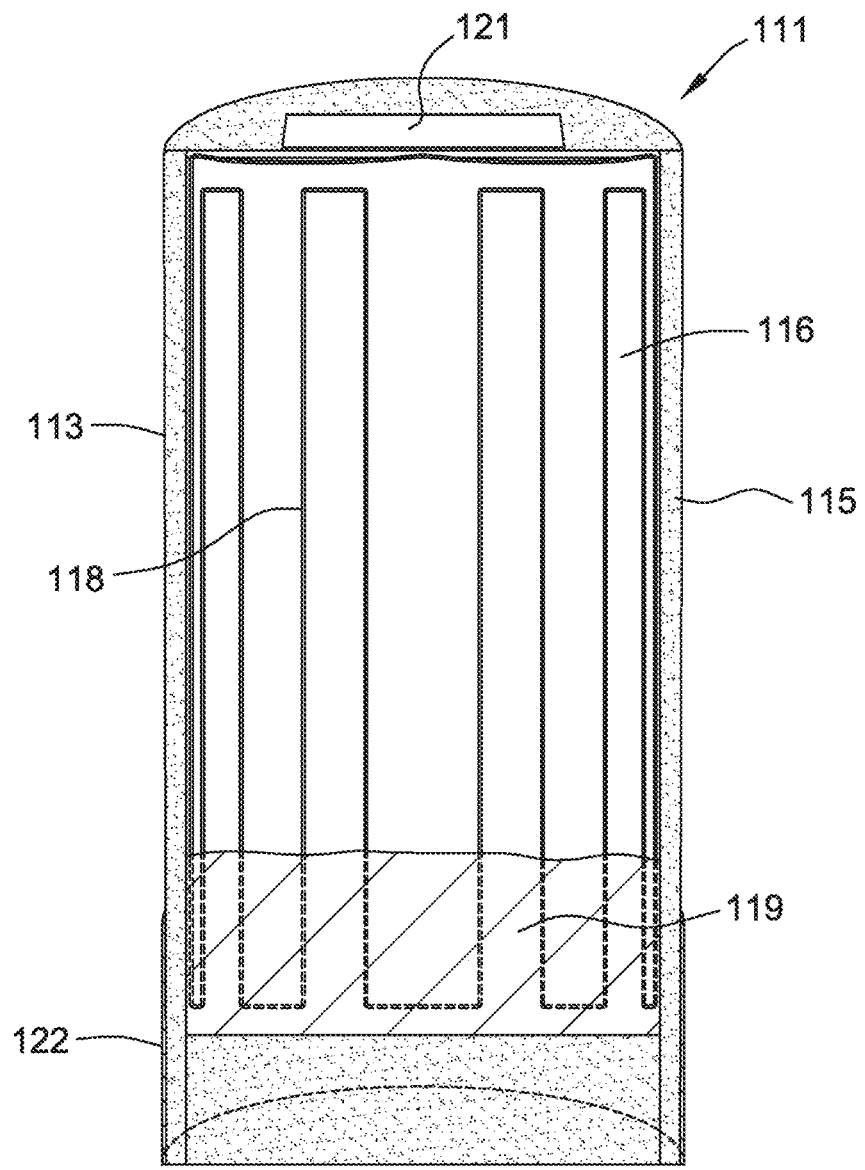
FIG. 6 is a perspective view of one half of an alternative embodiment of a monitoring device, with an alternative electrically conductive sensor being illustrated.

In another embodiment, illustrated in FIG. 6, the electrically conductive sensor 116 of the monitoring device 111 comprises a single continuous filament 118 (e.g., wire) that extends lengthwise of the bait product 113 coils back and forth across the width of the bait matrix. While this configuration does not have the redundancy of the sensor 116 of FIG. 5, the multiple lengthwise extensions of the filament provide more material that can be exposed as termites chew through the encasement 119, thus still providing the ability to track increasing changes in the at least one electrical characteristic over a period of time during which an infestation level increases or during which an increasing amount of the bait product 113 is consumed by the termites.

Figure 7:
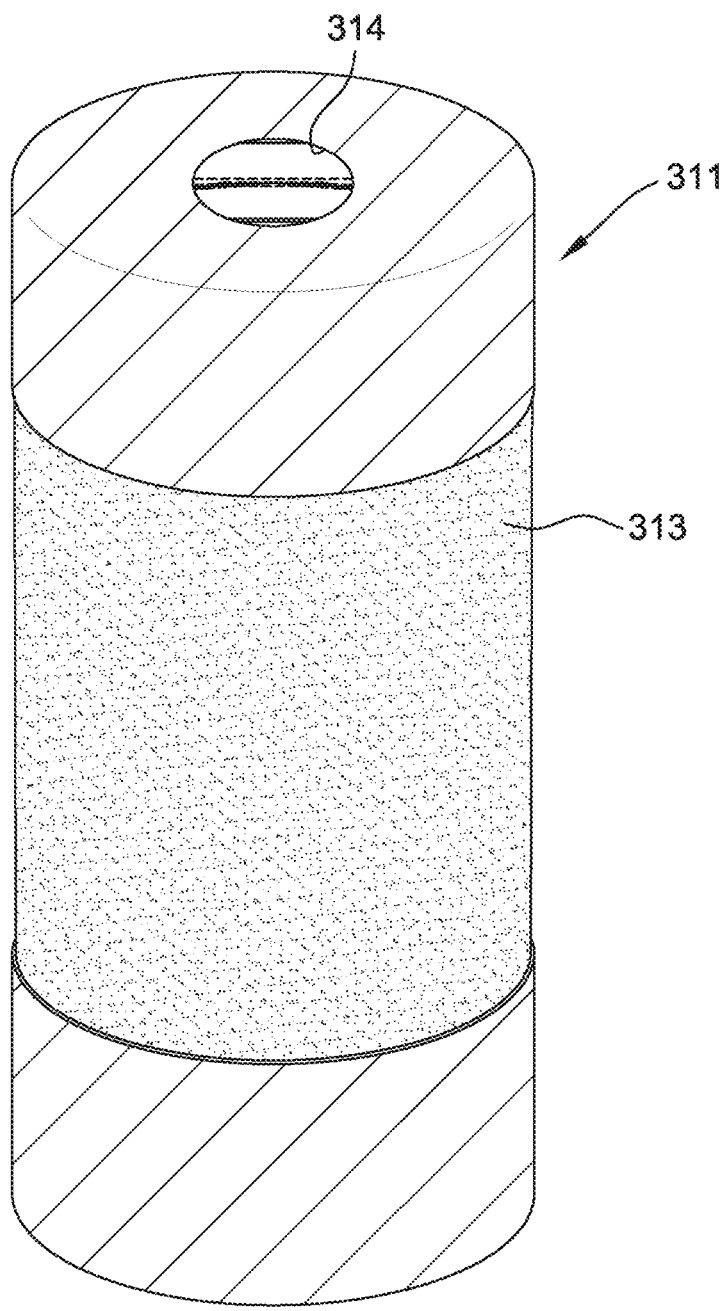
FIG. 7 is a perspective view of an alternative embodiment of a monitoring device for use with the pest monitoring system of FIG. 1 and positionable in the termite station of FIG. 2.

FIG. 7 illustrates another embodiment of a monitoring device 311 in which the bait product 313 has a central channel 314 extending longitudinally along the length of the bait product.

In another embodiment, this remote pest monitoring system 21 may be used to monitor rodent bait stations which incorporate a station housing and a rodent bait product. A sensor or sensors incorporated in or combined with the bait product can provide an accurate account of rodent feeding activity. This information could then be relayed to a remote monitoring system and a response plan activated based on the location and type of activity detected. As previously described, a mechanism can be combined with the sensor that will provide an alert as to the age or condition of the sensor and/or the bait product while in the field, thus enabling the service provider or inspector the ability to maintain viable and efficacious bait products in the field.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:
1. A pest monitoring system comprising:
a station housing having an interior space; and
a pest monitoring device positionable at least in part within the interior space of the station housing and operable to monitor for the presence of pests within the interior space of the station housing, the pest monitoring device comprising;
a bait product positionable within the interior space of the station housing;
an electrically conductive sensor disposed at least in part within the bait product, the sensor comprising an electrically conductive filament and an encasement positioned within the interior space and at least in part encasing the electrically conductive filament, the encasement being separate from the bait product and configured to prevent exposure of the electrically conductive filament to the environment within the interior space of the station housing prior to the presence of the pests within the interior space and allow exposure of the electrically conductive filament to the environment within the interior space of the station housing upon the presence of the pests within the interior space, the electrically conductive filament being reactive to exposure to the environment within the interior space of the station housing such that at least one electrical characteristic of the electrically conductive sensor changes in response to exposure of the filament to the environment within the interior space of the station housing; and
a communication member disposed within the station housing in communication with the electrically conductive sensor, the communication member being operable to determine the at least one electrical characteristic of the electrically conductive sensor and to determine the level of exposure to the environment of the electrically conductive sensor based on the at least one electrical characteristic, the communication member being further operable to send a signal exterior of the station housing indicative of the at least one electrical characteristic of the electrically conductive sensor.
2. The pest monitoring system of claim 1 wherein the pest monitoring system is a termite monitoring system, the encasement being constructed at least in part of a termite acceptable material, the electrically conductive filament being exposed to the environment within the station housing upon termites chewing through the encasement.

3. The pest monitoring system of claim 1 wherein the electrically conductive sensor comprises a plurality of electrically conductive filaments electrically connected together to define a parallel circuit.

4. The pest monitoring system of claim 1 wherein the electrically conductive filament comprises defines a single continuous circuit in which the filament coils back and forth within the encasement.

5. The pest monitoring system of claim 1 further comprising an interrogator device operable to communicate with the communication member within the station housing to receive the signal indicative of the at least one electrical characteristic of the electrically conductive sensor.

6. The pest monitoring system of claim 5 further comprising a remote monitoring system operable to communicate with the interrogator device to receive the signal indicative of the at least one electrical characteristic of the electrically conductive sensor.

7. A pest monitoring system comprising:
a station housing having an interior space; and
a pest monitoring device positionable at least in part within the interior space of the station housing and operable to monitor for the presence of pests within the interior space of the station housing, the pest monitoring device comprising;
a bait product positionable within the interior space of the station housing;
an electrically conductive sensor disposed at least in part within the bait product, the sensor comprising a plurality of electrically conductive filaments electrically connected together to define a parallel circuit, and an encasement positioned within the interior space and at least in part encasing the electrically conductive filaments, the encasement being separate from the bait product and configured to prevent exposure of the electrically conductive filament to the environment within the interior space of the station housing prior to the presence of the pests within the interior space and allow exposure of the electrically conductive filament to the environment within the interior space of the station housing upon the presence of the pests within the interior space, the electrically conductive filaments being reactive to exposure to the environment within the interior space of the station housing such that at least one electrical characteristic of the electrically conductive sensor changes in response to exposure of the filaments to the environment within the interior space of the station housing; and
a communication member disposed within the station housing in communication with the electrically conductive sensor, the communication member being operable to determine the at least one electrical characteristic of the electrically conductive sensor and to determine the level of exposure to the environment of the electrically conductive sensor based on the at least one electrical characteristic, the communication member being further operable to send a signal exterior of the station housing indicative of the at least one electrical characteristic of the electrically conductive sensor.

8. The pest monitoring system of claim 7 wherein the pest monitoring system is a termite monitoring system, the encasement being constructed at least in part of a termite acceptable material, at least one of the electrically conductive filaments being exposed to the environment within the station housing upon termites chewing through the encasement.

9. The pest monitoring system of claim 7 further comprising an interrogator device operable to communicate with the communication member within the station housing to receive the signal indicative of the at least one electrical characteristic of the electrically conductive sensor.

10. The pest monitoring system of claim 9 further comprising a remote monitoring system operable to communicate with the interrogator device to receive the signal indicative of the at least one electrical characteristic of the electrically conductive sensor.

11. The pest monitoring system of claim 7 wherein the encasement comprises at least one of a coating and a sheath encasing each individual filament of the electrically conductive sensor.

12. A method of monitoring for the presence of pests in proximity to a structure, the method comprising:
locating at least one monitoring device in proximity to the structure, the monitoring device comprising a bait product, an electrically conductive sensor disposed at least in part within the bait product, the sensor comprising an electrically conductive filament and an encasement positioned within the monitoring device and at least in part encasing the electrically conductive filament, the encasement being separate from the bait product and configured to prevent exposure of the electrically conductive filament to the environment prior to the presence of the pests within the interior space and allow exposure of the electrically conductive filament to the environment upon the presence of the pests, the electrically conductive filament being reactive to exposure to the environment exterior of the encasement such that at least one electrical characteristic of the electrically conductive sensor changes in response to exposure of the filament to the environment exterior of the encasement, and a communication member connected to the bait product in communication with the electrically conductive sensor, the communication member being operable to determine the at least one electrical characteristic of the electrically conductive sensor and to send a signal exterior of the station housing indicative of the at least one electrical characteristic of the electrically conductive sensor;
intermittently receiving the signal from the communication member indicative of the at least one electrical characteristic of the electrically conductive sensor;
determining the level of exposure to the environment of the electrically conductive sensor based on the at least one electrical characteristic; and
determining, based on a plurality of said signals received from the communication member over a period of time, at least one of a level of infestation of pests at the at least one monitoring device and a level of degradation of the bait product.

13. The method set forth in claim 12 wherein the locating step comprises locating a plurality of said monitoring devices in proximity to the structure.

14. The method set forth in claim 12 wherein the receiving step comprises receiving the signal from the communication member at a location remote from the structure such that the at least one of a level of infestation of pests at the at least one monitoring device and a level of degradation of the bait product can be monitored from said remote location.

15. The method set forth in claim 12 wherein the method is for monitoring the presence of termites in proximity to a structure, the encasement being constructed at least in part of a termite acceptable material whereby the electrically conductive filament is exposed to the environment exterior of the encasement upon termites chewing through the encasement.

\* \* \* \* \*